June 1, 1937.  L. SCRUGGS  2,082,264

ELECTRIC MOTOR

Filed June 22, 1935

INVENTOR:
LOYD SCRUGGS
BY Bakewell & Church
ATTORNEYS

Patented June 1, 1937

2,082,264

UNITED STATES PATENT OFFICE 2,082,264

ELECTRIC MOTOR

Loyd Scruggs, University City, Mo.

Application June 22, 1935, Serial No. 27,893

8 Claims. (Cl. 172—36)

This invention relates to fractional horsepower electric motors of the kind that are used in hand tools, toys and numerous other small, electrically-operated devices.

One object of my invention is to provide an electric motor whose parts are of such construction and arrangement that the motor is inexpensive to build, easy to assemble and capable of being constructed in the form of a very small, light-weight motor that can be held in a person's hand and moved easily to manipulate a tool, instrument or appliance directly attached to the armature shaft of the motor.

Another object is to provide a small, high-speed electric motor that is equipped with a built in fan which causes air to circulate through the motor in a sufficient volume to prevent the motor from overheating or the housing of the motor from becoming excessively hot, when the motor remains in operation for a long period of time.

Another object is to provide a fractional horse-power electric motor, which is of such design that parts of the motor which are liable to get out of order are easily accessible and capable of being inspected, cleaned or adjusted without the aid of factory equipment.

And still another object of my invention is to provide a compact, fractional, horse-power electric motor that is equipped with a casing or housing of novel construction, which can be easily disassembled to provide access to the field core, armature core and other internal parts, and whose component elements or members are held in assembled relationship by novel tie bars that permit the use of an air circulating fan of relatively great diameter. Other objects and desirable features of my invention will be hereinafter pointed out.

I have herein illustrated my invention embodied in an electric motor of the type that is intended to be held in the hand of a person who is manipulating a tool or instrument attached to the armature shaft of the motor, but I wish it to be understood that many features of my invention are applicable to fractional horse-power electric motors of the kind that are stationarily mounted on a supporting structure and also small electric motors of the kind that are used to propel electric toys, such as electric trains.

Figure 1 of the drawing is a longitudinal sectional view of an electric motor constructed in accordance with my invention.

In the accompanying drawing which illustrates the preferred form of my invention, A designates the laminated field core of the motor, B designates the armature core, C designates the commutator, D designates the armature shaft which is rotatably mounted in bearings carried by the housing of the motor, and E designates a fan that is rigidly attached to the armature shaft in such a way that when the motor is in operation, air will be circulated through the motor in a sufficient volume to prevent the housing from becoming so hot that it will be uncomfortable to the user's hand which supports the motor and grips the housing of same.

The housing of the motor is of elongated form and is constructed in a novel manner that makes it possible to equip the motor with a relatively large air circulating fan, the blades of which have a diameter considerably greater than the diameter of the armature core, and only slightly less than the external diameter of the field core. Another advantage or desirable feature of the housing is that it can be easily assembled or disassembled by a person of ordinary mechanical skill and without the aid of factory equipment, thereby making it possible for the owner or user of the motor to easily inspect, adjust or repair parts of the motor that are liable to become dirty or get out of adjustment. Said housing is made up of two end members F and G, constructed of insulating material, and a tubular shell H whose end portions are maintained in overlapping or abutting relationship with said end members F and G by a plurality of longitudinally-disposed tie members I that are detachably connected to the housing members F and G. The tie members I are constructed from flat metal bars, and arranged so that the intermediate portions of said bars are disposed on the inside of the field core, in the space between the field core and the armature core. In order to provide an unobstructed chamber for a fan of relatively great diameter, said tie bars are provided at one end with deformed or bent end portions which are disposed substantially flush with the exterior of the field core. If desired, the other end portions of said tie bars may also be deformed, or bent in such a way that the tie bars will define the position of the field core and prevent the same from shifting endwise relatively to the armature core, but this latter feature is not essential, to wit, using the tie bars to prevent endwise shifting of the field core, and may be omitted without departing from the spirit of my invention.

Figure 1:
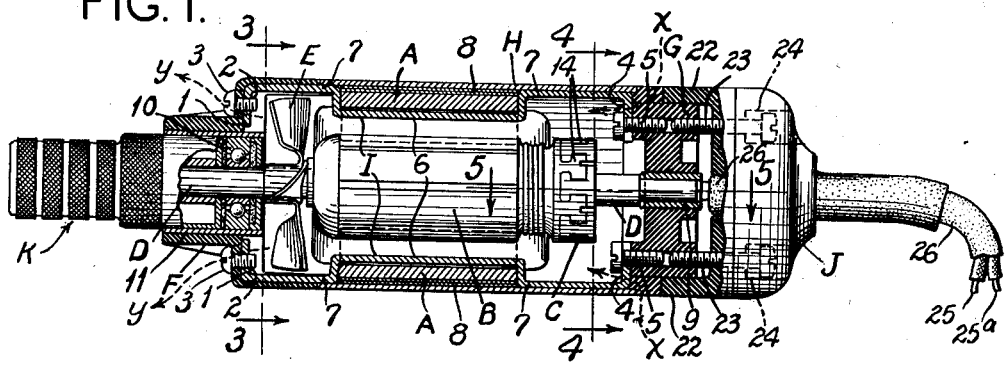
Figure 2:
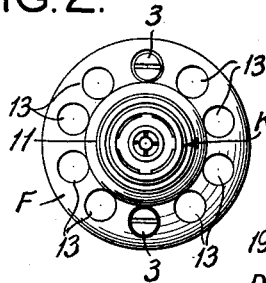
Figure 2 is a front end view of said motor.
Figure 3:
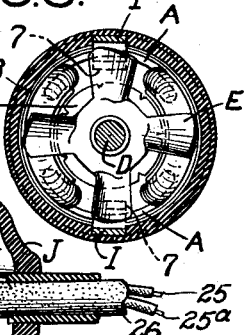
Figure 3 is a cross-sectional view, taken on the line 3—3 of Figure 1, looking in the direction indicated by the arrows.

Preferably, each tie bar I is formed from a flat strip of metal provided at its front end with an inwardly-projecting ear I having an internally screw-threaded hole 2 in same, which is adapted to receive a screw 3 that projects inwardly through the front housing member F, said housing member being made hollow or substantially cup-shaped, so as to permit the use of a fan E of relatively great diameter. At the opposite end of the tie bar is an inwardly-projecting, bifurcated portion 4 that is adapted to straddle the shank of a screw 5 whose threaded portion is screwed into a threaded hole formed in the inner face of the rear housing member G, the operation of tightening said screw 5 causing the head of same to bear against the bifurcated portion 4 of the tie bar and clamp said bar tightly to the rear housing member G. Each tie bar is provided with an intermediate portion 6 that lies on the inside of the field core A, as shown in Figure 1, and at the front ends of said tie bars are outwardly offset end portions 7 that lie in a plane substantially flush with the outer side of the field core. This is for the purpose of providing a large, unobstructed space inside of the housing, whose internal diameter is great enough to permit the use of a large fan E that will efficiently cool the motor. Preferably, the rear ends of the tie bars are provided with similar outwardly offset portions 7 that co-act with the previously described, outwardly offset portions at the front ends of the tie bars to form saddles for the field core which hold the same in proper endwise relationship with the armature coil, but, as previously explained, the outwardly offset portions at the rear ends of the tie bars may be omitted and any other suitable means may be used to prevent endwise movement of the field core.

In the operation of assembling the parts of the motor, the tie bars I are first attached to the rear housing member G by hooking the bifurcated portions 4 of said tie bars over the screws 5 and tightening said screws; the field core A is then slipped longitudinally over the tie bars and seated in the saddles formed by the outwardly offset portions 7 of said tie bars; the shell H is then slipped longitudinally over the field core and positioned with one of its ends in contact with the rear housing member G; the armature assembly, including the fan E, is then installed by moving the armature inwardly through the field core, so as to position the rear end of the armature shaft in a bearing in the rear housing member G, and thereafter the front housing member F is slipped over the front end portions 7 of the tie bars and attached to the ears I thereon by means of the screws 3, whose heads are accessible from the exterior of the front housing member E. Before the shell H is installed a strip of insulating material 8, such as paper, is wrapped around the field core A, so as to insulate the same from the shell H. After the tie bars have been combined with the field core and attached to the end members of the housing, it will be impossible for the field core to shift longitudinally relatively to the armature, and as said tie bars are formed from thin, flat strips of metal whose front end portions 7 are bent outwardly so as to be disposed substantially flush with the outer surface of the field core, ample space is provided on the interior of the housing for a relatively large air circulating fan E.

Any suitable type or kind of bearings may be used for the armature shaft, but I prefer to use a plain cylindrical bearing 9 for the rear end of said shaft and a friction-reducing bearing, such as a ball-bearing 10, for the front end of the armature shaft, the rear bearing 9 being mounted in the rear housing member G and the front bearing 10 being so constructed that the armature shaft projects forwardly through the front housing member F, said front housing member having a metal sleeve 11 that forms a substantial mounting for the outer race member of the ball bearing 10. As shown in Figure 1, the fan E is attached to the armature shaft at a point between the armature B and the front bearing 10. Air is admitted to the interior of the housing through a plurality of air inlet ports 12 formed in the rear housing member G, as indicated by the arrows $x$ in Figures 1 and 5, and said air, after absorbing heat from the armature and field of the motor, is discharged from the housing through a plurality of discharge ports 13 formed in the front housing member F, as indicated by the arrows $y$ in Figure 1. The air inlet ports 12 are preferably formed by an annular row of open-ended slots or notches formed in the peripheral portion of the rear housing member G, adjacent the point where the rear end of the shell H telescopes over said member, and the air discharge ports 13 are preferably formed by an annular row of holes formed in the front housing member F at a point outside of the tubular portion of said member which surrounds the metal sleeve 11 that carries the front bearing of the armature shaft. In order to insure efficient cooling of the field core, said core is made of such cross-sectional shape that portions of same will be spaced away a considerable distance from the interior of the shell H, thereby permitting air to circulate between the shell H and the exterior of portions of the field core.

Figure 4:
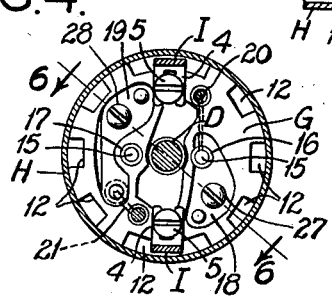
Figure 4 is a cross-sectional view, taken on the line 4—4 of Figure 1, looking in the direction indicated by the arrows.

The commutator C is provided with segments 14 separated from each other by slots or gaps, as shown in Figure 1, and having brush-engaging faces which are disposed at right angles to the armature shaft, thereby permitting the holders of the brushes 15 to be constructed from relatively long metal tubes 16 and 17 mounted in the rear housing member G in parallel relation to the armature shaft and provided at their outer ends with screws 16ᵃ and 17ᵃ that serve as abutments for the actuating springs 15ᵃ of substantial carbon brushes 15. The brush holder 16 is mechanically attached or connected to a brass contact plate 18 that is positioned in a recess formed in the inner side of the rear housing member G, and a second brass contact plate 19 is positioned in a separate recess in the inner side of the rear housing member in proximity to the other brush holder 17. However, said second contact plate 19 is insulated from the brush holder 17. A wire 20 leading from one of the field coils is attached to the brush holder 17 by the screw 17ᵃ in the outer end of said holder, and a wire 21 leading from the other field coil is attached to the contact plate 19, as indicated in dotted lines in Figure 4, the connection between the wire 21 and the contact plate 19 being made by a screw mounted on the outer side of the rear housing member G. If one side of an electric supply circuit is electrically connected to the contact plate 18, to which the brush holder 16 is mechanically attached, the circuit will be through the contact plate 18, brush holder 16, commutator C, second brush holder 17, thence through the wire 20 to one field coil and then from the other field coil through the wire 21 to the second contact plate 19 to which the other side of the supply circuit is electrically connected. I prefer to equip the motor with a built-in switch for establishing and cutting off electrical connection between a supply circuit and the contact plates 18 and 19, but it is not absolutely essential that the motor be equipped with a built-in switch, for if desired, a conventional duplex cord provided with a pronged connecter could be lead in through the rear housing member G and attached in any suitable way to the contact plates 18 and 19, thereby enabling the motor to be started by inserting the connecter in the socket of a supply circuit, and stopped by withdrawing said connecter from the socket.

Figure 5:
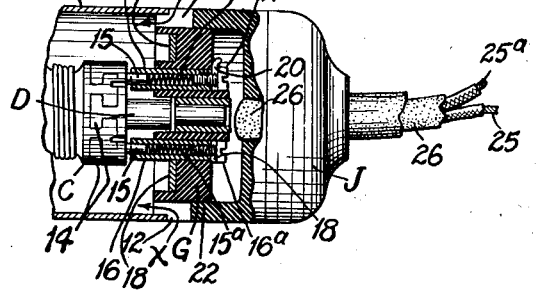
Figure 5 is a fragmentary longitudinal sectional view, taken on the line 5—5 of Figure 1.
Figure 7:
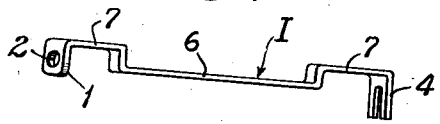
Figure 7 is a perspective view of one of the tie bars of the motor housing.

When the motor is equipped with a built-in switch, as herein illustrated, the actuating member of said switch is constructed and arranged so that it forms a cover or cap piece for the outer side of the rear end member G of the motor housing. Preferably, the actuating member of said switch is formed by a cap piece J made of insulating material and provided with a flange 22 that surrounds a reduced cylindrical portion on the rear end of the housing member G, as shown in Figures 1 and 5, said reduced cylindrical portion being of such length that the cap member J is capable of a slight longitudinal movement relatively to the housing member G which supports it. To close the circuit controlled by the switch, the cap member J is moved outwardly into its "on" position, shown in Figure 5, and to open said circuit, the cap member J is moved longitudinally in the opposite direction, into its "off" position, shown in Figure 1. Obviously, the parts of the switch might be arranged so as to cause inward movement of the member J to set the motor in operation, and outward movement of said member J to stop the motor. Means is provided for restricting the outward movement of the cap member J, and in the form of my invention herein illustrated, said means is formed by a plurality of screws 23 projecting inwardly through the cap member J and screwed into the rear housing member G, the shanks of said screws being of such length that when the cap member J is moved outwardly, or to the right, looking at Figure 1, the inner end walls of counter bores 24 formed in the cap member J will strike against the heads of the screws 23, and thus cause said cap member to come to rest in such a position that electrical connection is established between the contact plates 18 and 19 and the wires 25 and 25ᵃ of a duplex cord 26 that is attached to the cap member J. The screws 23 are accessible through the counter bores 24 in the cap member J, thereby enabling said cap member to be easily disconnected from the rear housing member G in the event it becomes necessary or desirable to inspect or remove the brushes 15, the screws in the outer ends of the brush holders being normally protected and concealed by the cap member J.

Figure 6:
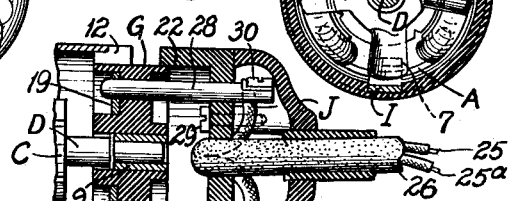
Figure 6 is a fragmentary longitudinal sectional view, taken on the line 6—6 of Figure 4.

The particular means employed to establish and interrupt the electrical connection between the contact plates 18 and 19 and the wires of the duplex cord 26 attached to the actuating member J of the switch, is not important, so far as my broad idea is concerned, but I prefer to provide said actuating member J with a pair of prongs 27 and 28 attached to the wires of the duplex cord 26 and constructed, proportioned or arranged so that they co-operate with the plates 18 and 19 to complete or break the circuit, depending upon the position of the member J. In the form of my invention herein illustrated the inner end portions of the prongs 27 and 28 project through holes in the contact plates 18 and 19, as shown in Figure 6. One of said prongs is of such cross-sectional shape and dimensions that when the actuating member J of the switch is pushed inwardly, as shown in Figure 1, the outer surface of said prong will be spaced away from the edge of the hole in the contact plate with which it co-operates, thereby opening the circuit, and when said actuating member J is pulled outwardly, as shown in Figure 6, both of the prongs 27 and 28 will bear against the edges of the holes in the contact plates 18 and 19, thereby establishing connection between said plates and the two wires 25 and 25ᵃ of the supply circuit. In order to insure a good metallic connection or contact between the plates 18 and 19 and the prongs 27 and 28, said prongs are preferably split or bifurcated so that they will have some resiliency. It is immaterial how the wires of the duplex cord 26 are attached to the prongs 27 and 28, but I prefer to construct the actuating member J of the switch in such a way that the devices used to connect the wires 25 and 25ᵃ to the prongs 27 and 28 are housed within the actuating member J and are effectively insulated from metallic portions on the outer side of the rear housing member G. To this end I form the actuating member J from two pieces of insulating material detachably connected together by screws 29, shown in Figure 6, that are accessible after the member J has been dismounted from the rear housing member G, and I provide the prongs 27 and 28 with binding screws 30 that are positioned in notches or cut out portions of the outer piece or part of the actuating member J. A control switch of the construction above described contributes greatly to the ease of handling and operating the motor, for the actuating member of said switch is formed by a cap piece on the rear end portion of the motor housing, and hence, can be easily manipulated to start or stop the motor, simply by pulling said cap piece outwardly or pushing it inwardly. Another desirable feature of such a switch is that if the motor should be accidentally dropped, or if the rear end portion of the motor should receive a sharp blow or shock, the member J will automatically move inwardly, and thus stop the motor. Obviously, the switch above described is not limited to use on electric motors, but, on the contrary, is capable of use on various other kinds of electrically-operated devices that comprise a part equipped with contact plates or the like, and made of such form that it can be used as a support for the movable member or actuating member of the switch. The said switch forms the subject-matter of my co-pending application for patent Serial No. 62,875, filed Feb. 8, 1936.

I have herein illustrated the motor as being equipped with a chuck, designated as an entirety by the reference character K in Figure 1, that is used for enabling a tool, instrument or appliance to be detachably connected to the front end portion of the armature shaft D of the motor. When equipped with such a device the motor forms a very handy and convenient source of electrical energy for operating a grinding wheel, a polishing wheel, a saw, and numerous other tools or instruments, due to its small size, its low weight, and the fact that it can be operated for long periods without liability of the housing becoming too hot to be conveniently held in the hand of the user. When the motor is equipped with a built-in switch, as herein illustrated, it is unnecessary for the user to pay any attention to the switch or exert pressure on the actuating member of the switch in order to maintain the motor circuit closed, for after the cap member J has been moved in one direction, the motor will continue in operation until said cap member is restored to its former position, and so long as the motor continues in operation, sufficient air will be circulated through the motor to effectively cool the same, the cooling means being so designed that the jets of air which emerge from the discharge ports 13 in the front housing member F, are projected directly onto the work being operated, with the result that dust, grindings or the like are blown off the work. In addition to the desirable features above mentioned, the motor above described is inexpensive to build; it is easy to assemble during the operation of constructing the motor, and as the parts of the motor which are apt to become dirty or get out of adjustment are easily accessible, the motor can be kept in operative condition without the aid of a skilled mechanic and factory equipment for disassembling and assembling the parts of the motor, as is necessary with fractional horse-power electric motors of conventional construction.

Having thus described my invention, what I claim as new and desire to secure by Letters Patent, is:

1. A fractional horse-power motor provided with a rotatable armature, a field core surrounding said armature, an elongated housing having end members in which the armature shaft is mounted, an air circulating fan attached to the armature shaft, and tie bars for connecting the end members of the housing together, disposed in the space between the armature and field core and provided at one end with outwardly-projecting portions that form an unobstructed fan space on the interior of the housing that is of greater diameter than the armature.

2. A motor of the kind described in claim 1, in which the bars are formed from flat strips of metal.

3. A motor of the kind described in claim 1, in which the tie bars are constructed so as to prevent the field core from moving longitudinally or endwise relatively to the armature.

4. A motor of the kind described in claim 1, in which the tie bars are internally connected to one end member of the housing and are detachably connected to the other end member of the housing by fastening devices accessible from the exterior of the housing.

5. A fractional horse-power electric motor, comprising a rotatable armature, a field core surrounding the armature, an air circulating fan attached to the armature shaft, housing members provided with bearings for the armature shaft, an elongated shell surrounding the field core and having its end portions arranged in engagement with said housing members, and relatively thin, flat tie bars disposed in the space between the armature and field core and detachably connected to said housing members, said tie bars being bent or deformed at one end so as to provide outwardly offset portions located in the zone of the fan blades.

6. A motor of the kind described in claim 5, in which the tie bars also have means for preventing the field core from moving endwise relatively to the armature.

7. In a motor of the kind described in claim 5, a cup-shaped portion on the front housing member that surrounds the fan, a metal sleeve in said housing member, and a friction reducing bearing in said sleeve for receiving the armature shaft.

8. In a motor of the kind described in claim 5, a commutator on the armature shaft provided with brush engaging faces disposed at approximately right angles to the armature shaft, spring-pressed brushes that act on the armature, holders for said brushes formed by tubes mounted in the rear housing member so that the brushes are accessible from the outer side of said member, and a pair of metal contact plates on the inner side of said rear housing member, one of said contact plates being electrically connected to one of the brush holders and the other of said contact blades being electrically connected to the field of the motor.

LOYD SCRUGGS.